United States Patent [19]

Gandiglio et al.

[11] Patent Number: 4,993,694
[45] Date of Patent: Feb. 19, 1991

[54] SUSPENSION DEVICE FOR VEHICLES, COMPRISING A TELESCOPIC SHOCK-ABSORBER AND AN AIR SPRING

[75] Inventors: Romolo Gandiglio, Cambiano; Maurizio Urbinati, Bruino, both of Italy

[73] Assignee: Fiat Auto S.p.A., Turin, Italy

[21] Appl. No.: 417,610

[22] Filed: Oct. 4, 1989

[30] Foreign Application Priority Data

Oct. 4, 1988 [IT] Italy .................. 67892 A/88

[51] Int. Cl.⁵ ............................................. F16F 9/04
[52] U.S. Cl. ........................... 67/64.240; 267/64.21; 267/64.27; 267/122
[58] Field of Search ............ 267/64.21, 64.19, 64.23, 267/64.24, 64.05, 64.27, 122, 118

[56] References Cited

U.S. PATENT DOCUMENTS

| | | | |
|---|---|---|---|
| 3,000,624 | 9/1961 | Cislo | 267/64.21 |
| 4,506,910 | 3/1985 | Bierens | 267/64.27 X |
| 4,655,438 | 4/1987 | Cameron | 267/64.24 |
| 4,712,776 | 12/1987 | Geno et al. | 267/64.24 X |
| 4,802,657 | 2/1989 | Wijnhoven et al. | 267/64.24 |

FOREIGN PATENT DOCUMENTS 0048833 12/1972 Japan .................. 267/64.24

Primary Examiner—Matthew C. Graham
Attorney, Agent, or Firm—Sughrue, Mion, Zinn, Macpeak & Seas

[57] ABSTRACT

A suspension device for motor vehicles comprises a telescopic shock-absorber and an air spring which is arranged coaxially with the shock-absorber around the region of the seal between the cylinder and the rod of the shock-absorber. The air spring defines a pneumatic chamber of annular cross-section.

2 Claims, 1 Drawing Sheet

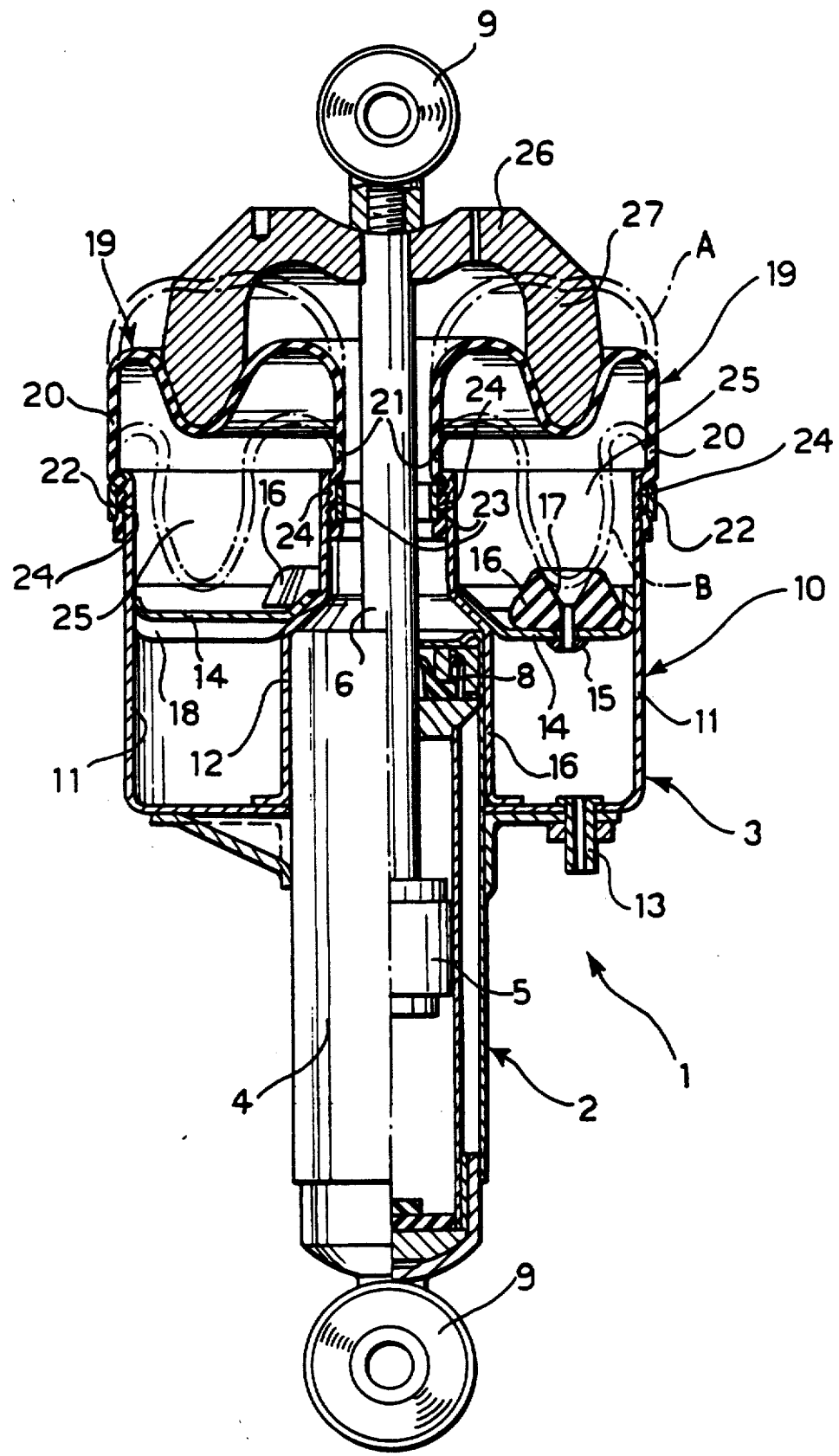

SUSPENSION DEVICE FOR VEHICLES, COMPRISING A TELESCOPIC SHOCK-ABSORBER AND AN AIR SPRING

DESCRIPTION

The present invention relates to a suspension device for vehicles, comprising a telescopic shock-absorber constituted by a cylinder with a piston which is slidable therein and is fixed to a rod that projects sealingly from the cylinder, and an air spring arranged externally of the shock-absorber and coaxially therewith, the spring comprising a casing which is at least partially flexible and defines a pneumatic chamber.

This arrangement, which is particularly advantageous from the point of view of its compactness, has the disadvantage that the pneumatic chamber of the air spring (which is full of compressed air) is situated around the region of the seal between the rod and the cylinder of the shock-absorber. The pressure which is exerted on the seal of the shock-absorber causes sealing problems in the shock-absorber.

The object of the present invention is to provide a suspension of the type specified at the beginning of the present description, which does not have the above disadvantage and has a simple structure.

According to the present invention, this object is achieved by virtue of the fact that the pneumatic chamber has an annular cross-section, at least in the region of the seal between the rod and the cylinder.

The casing of the air spring preferably comprises:

a rigid axial portion which is fixed to one of the cylinder and the rod of the shock-absorber and is open at one end, the rigid portion having an annular inner wall and an annular outer wall which are coaxial with each other, a flexible axial portion which is fitted to the open end of the rigid-walled portion and on the top of which bears an annular thrust member carried by the other of the rod and the cylinder respectively, the flexible portion having an annular conformation with outer and inner peripheral edges fixed sealingly to the annular outer wall and the annular inner wall of the rigid portion, respectively.

By virtue of the above characteristics, a simple suspension device is produced, in which the sealing ring of the shock-absorber is completely isolated from the pressurised space of the air spring.

Further characteristics and advantages of the present invention will become clear from the detailed description which follows with reference to the appended drawing provided by way of non-limiting example and showing a partially-sectioned side elevational view of a suspension device according to the present invention.

A suspension device is generally indicated 1 and is constituted by a telescopic shock-absorber 2 and an air spring 3 which is coaxial with the shock-absorber 2.

In known manner, the shock-absorber 2 comprises a cylinder 4 with a piston 5 which is slidable therein and is fixed to a rod 6. The rod 6 projects from that end of the cylinder 4, indicated 7, which is at the top in the drawing. In correspondence with the end 7, the cylinder carries a sealing ring 8 which, in known manner, effects the seal between the rod 6 and the cylinder 4. Two resilient bushes 9 for connection to the body of the vehicle and to a wheel support (not illustrated in the drawing) are fixed to the lower end of the cylinder 4 and to the upper end of the rod 6.

The air spring 3 includes a rigid casing 10 which is open at the top and is composed of an outer cylindrical wall 11 and an inner cylindrical wall 12 which are coaxial with each other and in their turn are coaxial with the shock-absorber 2. The rigid casing 10 is fixed to the cylinder 4 of the shock-absorber 2 and is provided at its lower end with an aperture 13 for connection to a compressed air source (not illustrated). An annular intermediate support plate 14 is situated in the rigid casing 10 and has its outer and inner circumferential edges welded to the outer wall 11 and the inner wall 12 of the casing 10, respectively. The support plate 14 has a plurality of holes 15, a resilient stop buffer 16 being located in each. Each buffer 16 has an inner through-hole 17 situated in correspondence with the respective hole 15, for the passage of the air through the intermediate plate 14. The plate 14 is also provided with a plurality of stiffening ribs 18.

A flexible casing 19, which is open at the bottom, is fitted in correspondence with the upper opening of the rigid casing 10 and has a cylindrical outer wall 20 and a cylindrical inner wall 21. The outer wall 20 of the flexible casing 19 is fixed sealingly to the outer wall 11 of the rigid casing 10 by means of a ring 22. Similarly, the inner wall 21 of the flexible casing 19 is fixed sealingly to the inner wall 12 of the rigid casing 10 by means of a ring 23. The circumferential surfaces of contact between the flexible casing 19 and the rigid casing 10 are knurled 24 to improve their grip. The deformable casing 19, the rigid casing 10, and the intermediate support plate 14 define an annular chamber 25 which constitutes the active part of the spring 3.

An annular thrust member 26, whose outer circumferential edge is formed as an axially-extending projection 27, is fixed to the upper end of the rod 6 and bears against the top of the deformable casing 19.

The extreme operating configurations of the air spring 3 are shown in broken outline in the drawing. The upper broken line, indicated A, shows the configuration of the deformable casing 19 which corresponds to the maximum extension of the shock-absorber 2. The lower broken line, indicated B, shows the deformable casing 19 in correspondence with the maximum contraction of the shock-absorber 2. In this configuration, the annular projection 27 of the thrust member 26 reacts against the stop buffers 16. A generic operating configuration intermediate the extreme configurations described above is shown in continuous outline.

As can be seen, the sealing ring 8 of the shock-absorber 2 is completely isolated from the pressurised region of the air spring 3 and sealing defects of the shock-absorber, with the consequent risk of admission of an unwanted pressure to the shock-absorber such as to alter its shock-absorbing characteristics, are therefore avoided.

Naturally, the principle of the invention remaining the same, the forms of embodiment and details of construction may be varied widely with respect to those described and illustrated, without thereby departing from the scope of the present invention.

We claim:

1. A suspension device for vehicles, comprising a telescopic shock-absorber constituted by a cylinder with a piston which is slidable therein and is fixed to a rod that projects sealingly from the cylinder and an air spring arranged externally of the shock-absorber and coaxially therewith, the spring comprising a casing which is at least partially flexible and defines a pneumatic chamber having an annular cross-section, at least in the region of the seal between the rod and the cylinder, wherein the casing of the air spring comprises:

a rigid axial portion which is fixed to one of the cylinder and the rod of the shock-absorber and is open at one end, the rigid portion having an annular inner wall and an annular outer wall which are coaxial with each other, a flexible axial portion which is fitted to the open end of the rigid-walled portion and on the top of which bears an annular thrust member carried by the other of the rod and the cylinder respectively, the flexible portion having an annular conformation with outer and inner peripheral edges fixed sealingly to the annular outer wall and the annular inner wall of the rigid portion, respectively.

2. A suspension device according to claim 1, wherein an intermediate annular support plate is situated within the rigid axial portion and carries one or more resilient stop buffers, and in that the periphery of the thrust member is bent axially to cooperate with the buffers.

* * * * *